United States Patent
Han et al.

(10) Patent No.: US 10,028,187 B2
(45) Date of Patent: Jul. 17, 2018

(54) APPARATUS AND METHOD FOR CONTROL CHANNEL MONITORING IN A NEW CARRIER TYPE (NCT) WIRELESS NETWORK

(71) Applicant: Intel Corporation, Santa Clara, CA (US)

(72) Inventors: Seunghee Han, Cupertino, CA (US); Jong-Kae Fwu, Sunnyvale, CA (US); Hong He, Beijing (CN); Yuan Zhu, Beijing (CN); Alexei Davydov, Nizhny Novgorod (RU); Shafi Bashar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 14/759,119

(22) PCT Filed: Dec. 24, 2013

(86) PCT No.: PCT/US2013/077649
§ 371 (c)(1),
(2) Date: Jul. 2, 2015

(87) PCT Pub. No.: WO2014/107383
PCT Pub. Date: Jul. 10, 2014

(65) Prior Publication Data
US 2015/0341818 A1 Nov. 26, 2015

Related U.S. Application Data

(60) Provisional application No. 61/748,706, filed on Jan. 3, 2013.

(51) Int. Cl.
*H04W 4/00* (2018.01)
*H04W 36/14* (2009.01)
(Continued)

(52) U.S. Cl.
CPC ........... *H04W 36/14* (2013.01); *H04B 7/024* (2013.01); *H04B 7/0486* (2013.01);
(Continued)

(58) Field of Classification Search
None
See application file for complete search history.

(56) References Cited

U.S. PATENT DOCUMENTS

2011/0103288 A1* 5/2011 Lee .................. H04W 48/12
370/312
2011/0194428 A1* 8/2011 Wang ................ H04W 72/005
370/252
(Continued)

FOREIGN PATENT DOCUMENTS

WO  2010121194 A1  10/2010
WO  2011020027 A1  2/2011
(Continued)

OTHER PUBLICATIONS

U.S. Appl. No. 61/734,311, Malladi, "Apparatus and Methods of MBMS Support in New Carrier Type in LTE".*
(Continued)

*Primary Examiner* — Kwang B Yao
*Assistant Examiner* — Juvena Loo
(74) *Attorney, Agent, or Firm* — Grossman, Tucker, Perreault & Pfleger, PLLC (57) ABSTRACT

Generally, this disclosure provides apparatus and methods for improved control channel monitoring in a New Carrier Type (NCT) wireless network. A User Equipment (UE) device may include a receiver circuit to receive a Multicast/Broadcast over Single Frequency Network (MBSFN) for Physical Multicast Channel (P-MCH) transmission from an evolved Node B (eNB); an MBSFN for P-MCH detection module to detect and extract an enhanced physical downlink
(Continued)

control channel (EPDCCH) signal from the MBSFN subframe for P-MCH transmission; and an EPDCCH monitor module to decode and monitor the extracted EPDCCH signal.

22 Claims, 11 Drawing Sheets

(51) Int. Cl.

| | |
|---|---|
| H04W 24/10 | (2009.01) |
| H04B 7/06 | (2006.01) |
| H04B 7/0456 | (2017.01) |
| H04J 11/00 | (2006.01) |
| H04W 72/04 | (2009.01) |
| H04B 7/024 | (2017.01) |
| H04W 56/00 | (2009.01) |
| H04W 72/00 | (2009.01) |
| H04W 88/08 | (2009.01) |
| H04L 29/06 | (2006.01) |
| H04W 36/00 | (2009.01) |
| H04W 48/08 | (2009.01) |
| H04W 28/02 | (2009.01) |
| H04W 36/22 | (2009.01) |
| H04W 48/16 | (2009.01) |
| H04W 52/02 | (2009.01) |
| H04L 12/46 | (2006.01) |
| H04L 29/12 | (2006.01) |
| H04W 12/02 | (2009.01) |
| H04W 76/14 | (2018.01) |
| H04W 76/10 | (2018.01) |
| H04W 76/11 | (2018.01) |
| H04W 88/06 | (2009.01) |
| H04W 84/12 | (2009.01) |
| H04L 5/00 | (2006.01) |
| H04W 88/16 | (2009.01) |
| H04W 8/08 | (2009.01) |

(52) U.S. Cl.
CPC ......... *H04B 7/0626* (2013.01); *H04B 7/0632* (2013.01); *H04J 11/0053* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 72/005* (2013.01); *H04W 72/042* (2013.01); *H04W 72/0413* (2013.01); *H04W 76/10* (2018.02); *H04W 76/11* (2018.02); *H04W 76/14* (2018.02); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/23* (2018.01)

(56) References Cited

U.S. PATENT DOCUMENTS

| | | | | |
|---|---|---|---|---|
| 2011/0243056 | A1* | 10/2011 | Jen | H04L 5/0007 370/312 |
| 2011/0299449 | A1* | 12/2011 | Kwon | H04L 5/0023 370/312 |
| 2012/0201188 | A1* | 8/2012 | Ishii | H04L 5/0023 370/313 |
| 2012/0257562 | A1* | 10/2012 | Kim | H04W 4/06 370/312 |
| 2012/0263043 | A1* | 10/2012 | Xu | H04W 72/005 370/241 |
| 2012/0300689 | A1* | 11/2012 | Lee | H04W 24/10 370/312 |
| 2013/0294317 | A1* | 11/2013 | Malladi | H04W 4/06 370/312 |
| 2014/0098732 | A1* | 4/2014 | Chen | H04L 5/0092 370/312 |

FOREIGN PATENT DOCUMENTS

| | | |
|---|---|---|
| WO | 2011-085195 A1 | 7/2011 |
| WO | 2011085189 A1 | 7/2011 |

OTHER PUBLICATIONS

R1-123376, 3GPP TSG-RAN WG1 Meeting #70.*
U.S. Appl. No. 61/709,932; Chen.*
International Search Report and Written Opinion received for PCT Application No. PCT/US2013/077649, dated Mar. 26, 2014, 13 pages.
European Office Action issued in European Application No. 13870241.0, dated Aug. 24, 2016, 9 pages.
ZTE: "Discussion on ePDCCH restriction subframe clusters", 3GPP Draft; R1-123376, vol. RAN WG1, Qingdao, China, Aug. 5, 2012, www.3gpp.org/ftp/tsg_ran/wg1_rl1/tsgr1_70/docs/, section 2.
CATT: "E-PDCCH resource indication", 3GPP draft; R1-123223, vol. RAN WG1, Qingdao, China, Aug. 5, 2012, www.3gpp.org/ftp/tsg_ran/wg1_rl1/tsgr1_70/docs/, section 2.2.

* cited by examiner

```
MBSFN-SubframeConfig-v12-IEs ::=  SEQUENCE {
    radioframeAllocationPeriod       ENUMERATED {n1, n2, n4, n8, n16, n32},
    radioframeAllocationOffset       INTEGER (0..7),
    subframeAllocation               CHOICE {
        oneFrame                         BIT STRING (SIZE(6)),
        fourFrames                       BIT STRING (SIZE(24))
    },
    epdcch-ConfigSCell-r11           EPDCCH-Config-r11    OPTIONAL    -- Need ON
}
```

FIG. 11 though the following Detailed Description will proceed
APPARATUS AND METHOD FOR CONTROL CHANNEL MONITORING IN A NEW CARRIER TYPE (NCT) WIRELESS NETWORK

FIELD

The present disclosure relates to wireless networks, and more particularly, to apparatus and methods for control channel monitoring in a New Carrier Type (NCT) wireless network.

BACKGROUND

Wireless networks, for example Long Term Evolution (LTE) and LTE-Advanced (LTE-A) networks, may be heterogeneous networks that include "macro cells," providing higher power/wider area coverage, and "small cells," providing lower power/reduced area coverage. Small cells may include "femto cells," suitable for home or office coverage and "pico cells," for larger indoor environments such as shopping centers. A base station, for example an evolved Node B (eNB) transceiver, may be associated with each cell to provide network access to wireless mobile devices, for example User Equipment (UEs), passing through that cell coverage area.

As network traffic increases, new system enhancements are being implemented to improve bandwidth utilization and efficiency including the introduction of new carrier types (NCTs) with modified frame structures and synchronization methods. A heterogeneous network may include a mixture of eNBs, some operating with an NCT and others operating with a legacy carrier type. Some efforts to increase downlink (DL) throughput may include the reduction or removal of legacy physical downlink control channels (PDCCH) or cell specific reference signals (CRS). Further, the demodulation may rely on a demodulation reference signal (DMRS) instead of the CRS. For example the density of the CRS may be reduced in the frequency domain, the time domain or both. This may adversely affect legacy control channels that rely on CRS for demodulation, such as the physical broadcast channel (PBCH), physical hybrid-ARQ indicator channel (PHICH), physical control format indicator channel (PCFICH), and physical downlink control channel (PDCCH). This, in turn, may adversely impact backward compatibility to legacy UEs operating in an NCT environment, particularly when the NCT is configured as a standalone-carrier that is relied upon to transmit the physical signals that support initial access of the UE to the network (e.g., synchronization and PBCH, etc.).

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides apparatus and methods for improved control channel monitoring in a New Carrier Type (NCT) wireless network. An eNB, operating in an NCT environment, may reduce or omit the transmission of CRS and PDCCH signals in a downlink subframe in order to increase bandwidth available for downlink throughput. As an alternative, therefore, in some embodiments, the eNB may be configured to provide, and the UE configured to monitor, the PDCCH, or the EPDCCH, in a Multicast/Broadcast over Single Frequency Network (MBSFN) subframe configured for Physical Multicast Channel (P-MCH) transmission. The PDCCH may be time division multiplexed (TDM) with the P-MCH and the EPDDCH may be frequency division multiplexed (FDM) with the P-MCH. A Radio Resource Control (RRC) message extension may be employed to indicate the use of this mode of operation.

In some embodiments, the eNB may be configured to provide, and the UE configured to monitor, the PDCCH, or the EPDCCH, at another subframe, or on another carrier, that is configured to transmit a PDCCH or an EPDCCH signal. The identity of that other subframe or carrier may be indicated by the MBSFN subframe for P-MCH. In some embodiments, the PDCCH or EPDCCH may be multiplexed with the P-MCH by superposition of the signals, as will be explained in greater detail below. Alternatively, in some embodiments, the UE may be configured to forgo the opportunity to monitor the PDCCH or EPDCCH in the MBSFN subframe for P-MCH transmission in an NCT wireless network.

Figure 1:
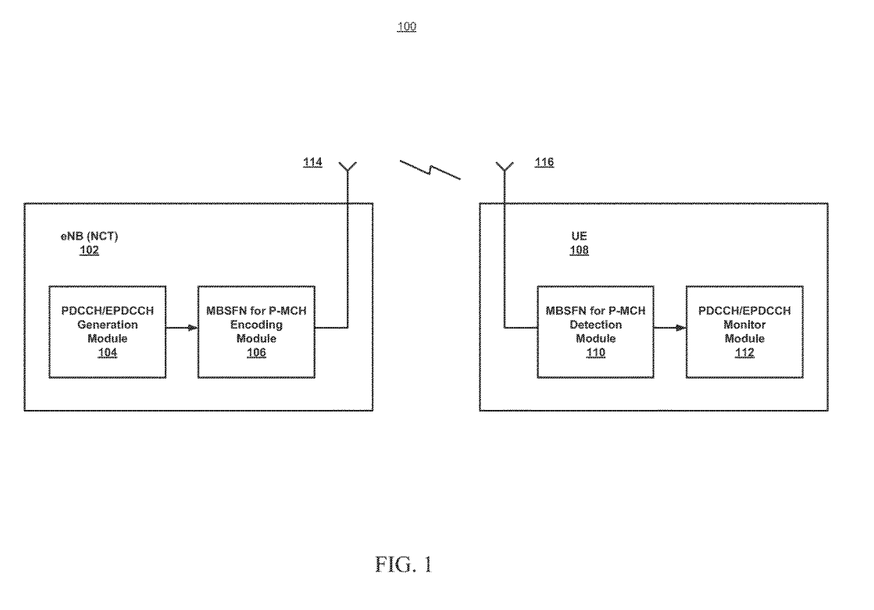
FIG. 1 illustrates a top level system diagram of one example embodiment consistent with the present disclosure.

FIG. 1 illustrates a top level system diagram 100 of one example embodiment consistent with the present disclosure. An eNB transceiver 102 configured to operate in an NCT mode is shown to be in communication with a UE 108 in a wireless network. The eNB 102 may include a PDCCH/EPDCCH signal generation module 104 configured to generate either or both types of signals. The eNB may further include an MBSFN for P-MCH encoding module 106 configured to include or encode the PDCCH or EPDCCH signals in an associated MBSFN subframe for P-MCH transmission (or an alternate subframe or alternate carrier), as will be explained in greater detail below. A transmitter circuit (not shown) may also be provided to transmit the MBSFN subframe for P-MCH transmission to the UE 108 through antenna 114.

The UE 108, may include an MBSFN for P-MCH detection module 110 configured to detect and extract the PDCCH or EPDCCH signal from the received MBSFN for P-MCH subframe, as will be explained in greater detail below, which is received through antenna 116 and a receiver circuit (not shown). The UE 108 may further include a PDCCH/EPDCCH monitor module 112 configured to decode and monitor the extracted PDCCH/EPDCCH signal.

While this is a simplified example, for illustration purposes, it will be appreciated that in practice any configuration of eNBs and UEs of various types may be deployed. The wireless network may be a heterogeneous network including NCT and non-NCT eNBs which may further be classified as standalone or non-standalone configurations. The wireless network may comply with, or otherwise be compatible with, the Third Generation Partnership Project (3GPP) Long Term Evolution (LTE) and/or LTE-Advanced (LTE-A) based wireless network standard, including current, previous and future versions of that standard.

Figure 2:
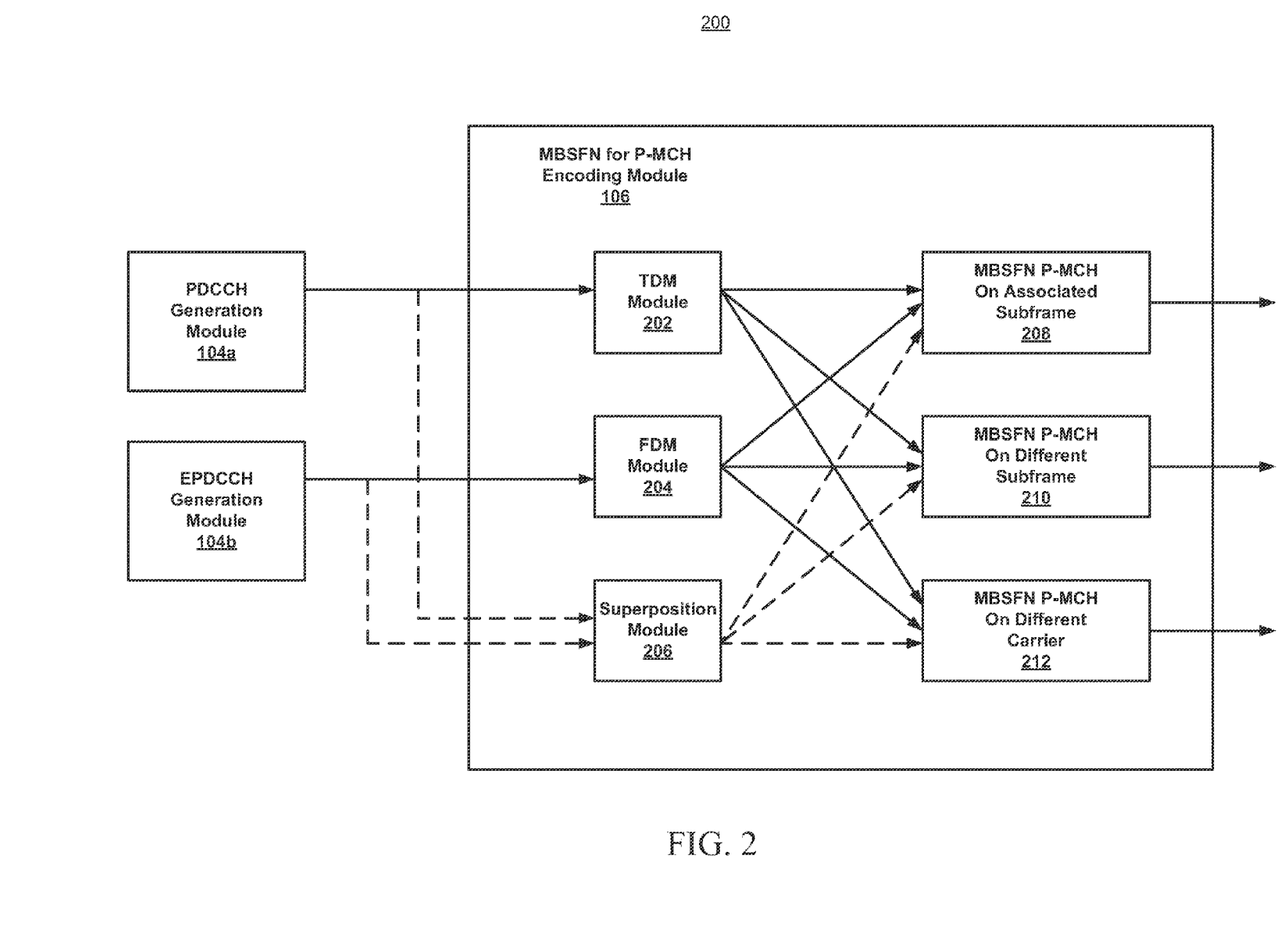
FIG. 2 illustrates a block diagram of one example embodiment consistent with the present disclosure.

FIG. 2 illustrates a block diagram 200 of one example embodiment consistent with the present disclosure. MBSFN for P-MCH encoding module 106 (of eNB 102) is shown to further include a TDM module 202, an FDM module 204 and a signal superposition module 206. These modules will be referred to and described in greater detail below in connection with subsequent figures. As a preliminary overview, however, the TDM module 202 may be configured to perform time domain multiplexing of the PDCCH signal, provided by PDCCH generation module 104a, onto an MBSFN P-MCH subframe 208, 210 or 212. In some embodiments, the FDM module 204 may be configured to perform frequency domain multiplexing of the EPDCCH signal, provided by EPDCCH generation module 104b, onto an MBSFN P-MCH subframe 208, 210 or 212. In some embodiments, the signal superposition module 206 may be provided as an optional alternative that is configured to superimpose either the PDCCH or EPDCCH signals onto an MBSFN P-MCH subframe 208, 210 or 212 in a manner that facilitates subsequent extraction by the UE 108 after transmission from the eNB 102 to the UE 108.

Figure 3:
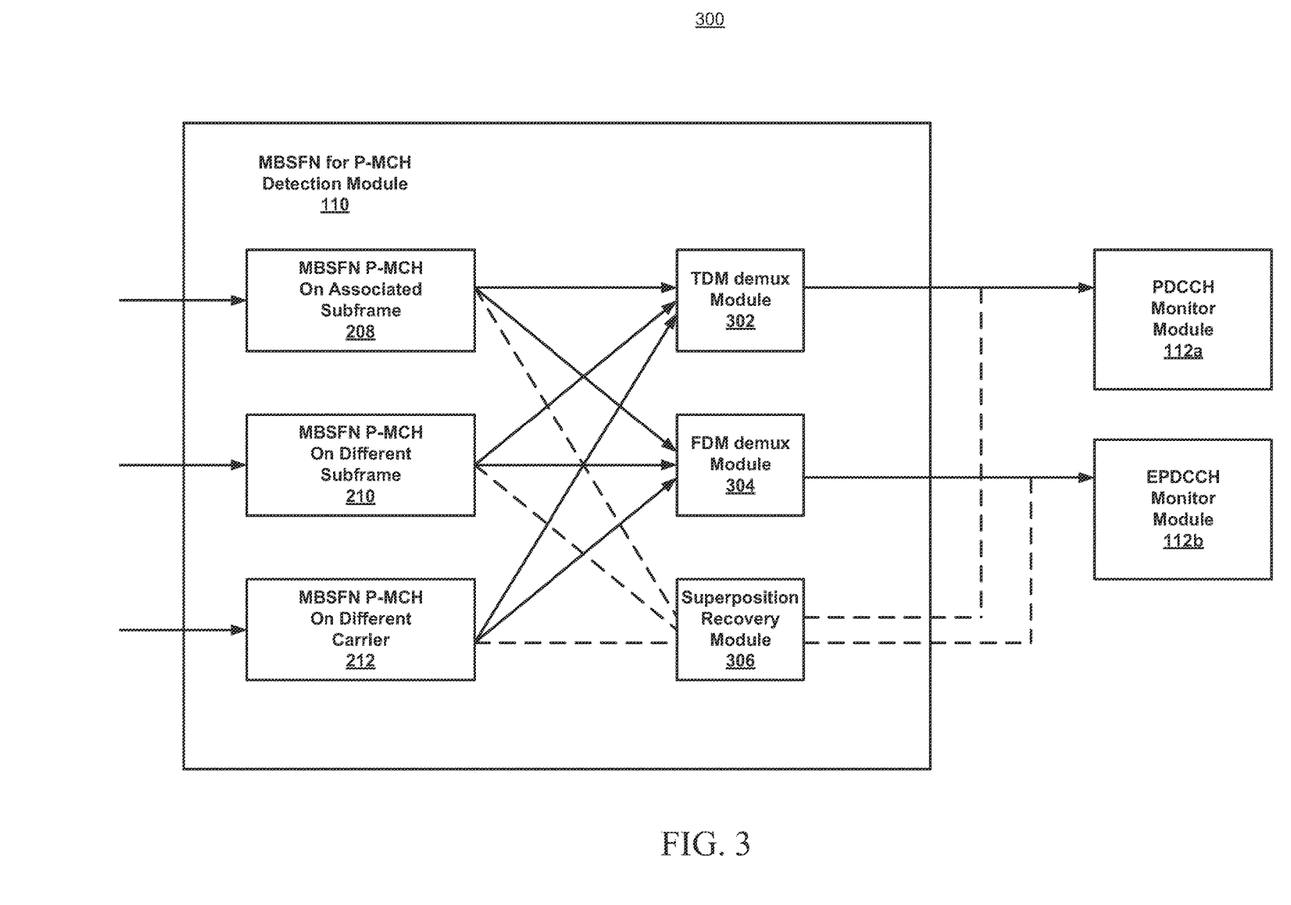
FIG. 3 illustrates a block diagram of another example embodiment consistent with the present disclosure.

FIG. 3 illustrates a block diagram 300 of another example embodiment consistent with the present disclosure. MBSFN for P-MCH detection module 110 of UE 108) is shown to further include a TDM de-multiplexer module 302, an FDM de-multiplexer module 304 and a signal superposition recovery module 306. These modules will be referred to and described in greater detail below in connection with subsequent figures. As a preliminary overview, however, the TDM demux module 302 may be configured to perform time domain de-multiplexing of the PDCCH signal, received from an MBSFN P-MCH subframe 208, 210 or 212, and provide it to the PDCCH monitor module 112a. In some embodiments, the FDM demux module 304 may be configured to perform frequency domain de-multiplexing of the EPDCCH signal, received from an MBSFN P-MCH subframe 208, 210 or 212, and provide it to the EPDCCH monitor module 112b. In some embodiments, the signal superposition recovery module 306 may be provided as an optional alternative that is configured to recover or extract either the PDCCH or EPDCCH signals that have been superimposed onto a received MBSFN P-MCH subframe 208, 210 or 212 and provide the extracted signal to the appropriate monitor module 112a or 112b.

Figure 4:
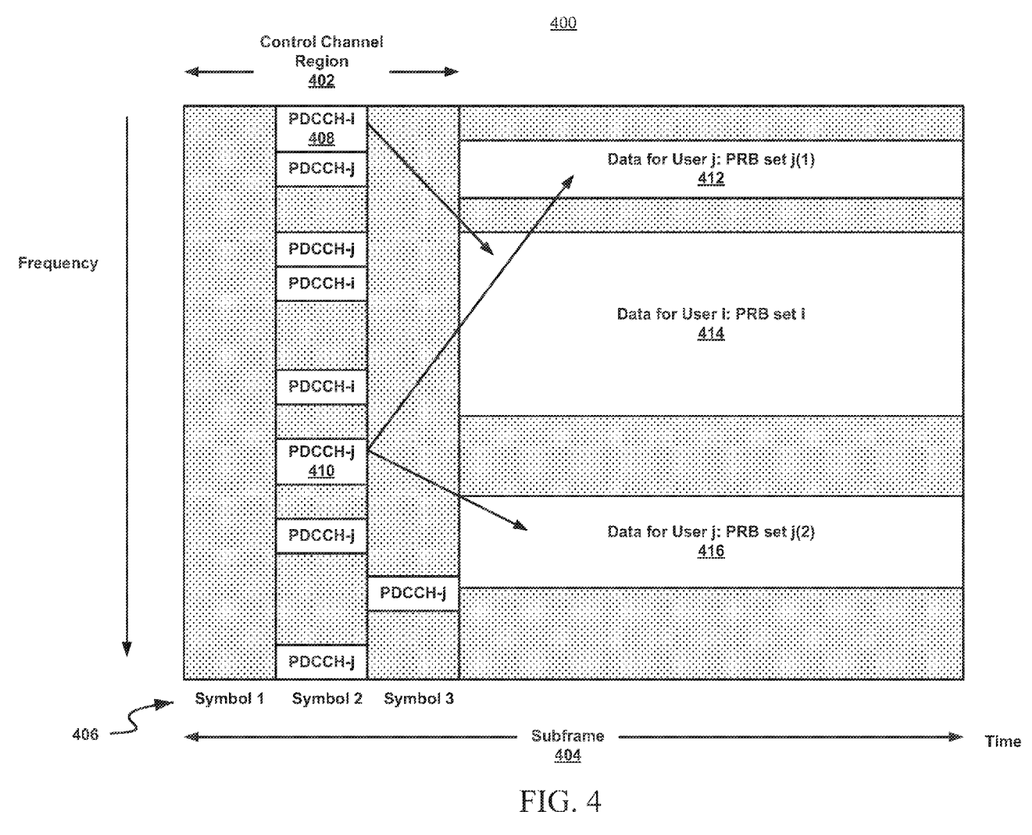
FIG. 4 illustrates an example of PDCCH and Physical Downlink Shared Channel (PDSCH) signals multiplexed in the time domain.

FIG. 4 illustrates an example 400 of PDCCH and associated PDSCH signals multiplexed in the time domain. In a legacy (e.g., non-NCT) system, the PDCCH may be included in the control channel region 402 of a downlink subframe 404, which occupies the first few (e.g., 1-4) symbols 406 of the subframe. The control channels are time multiplexed, as shown, with the data (on the PDSCH) occupying Physical Resource Blocks (PRBs) 412, 414, 416. Different PDCCH symbols may be provided for different data PRBs. For example, PDCCH-i 408 is associated with PRB for user (i) 414 and PDCCH-j 410 is associated with PRBs for user (j) 412, 416.

Figure 5:
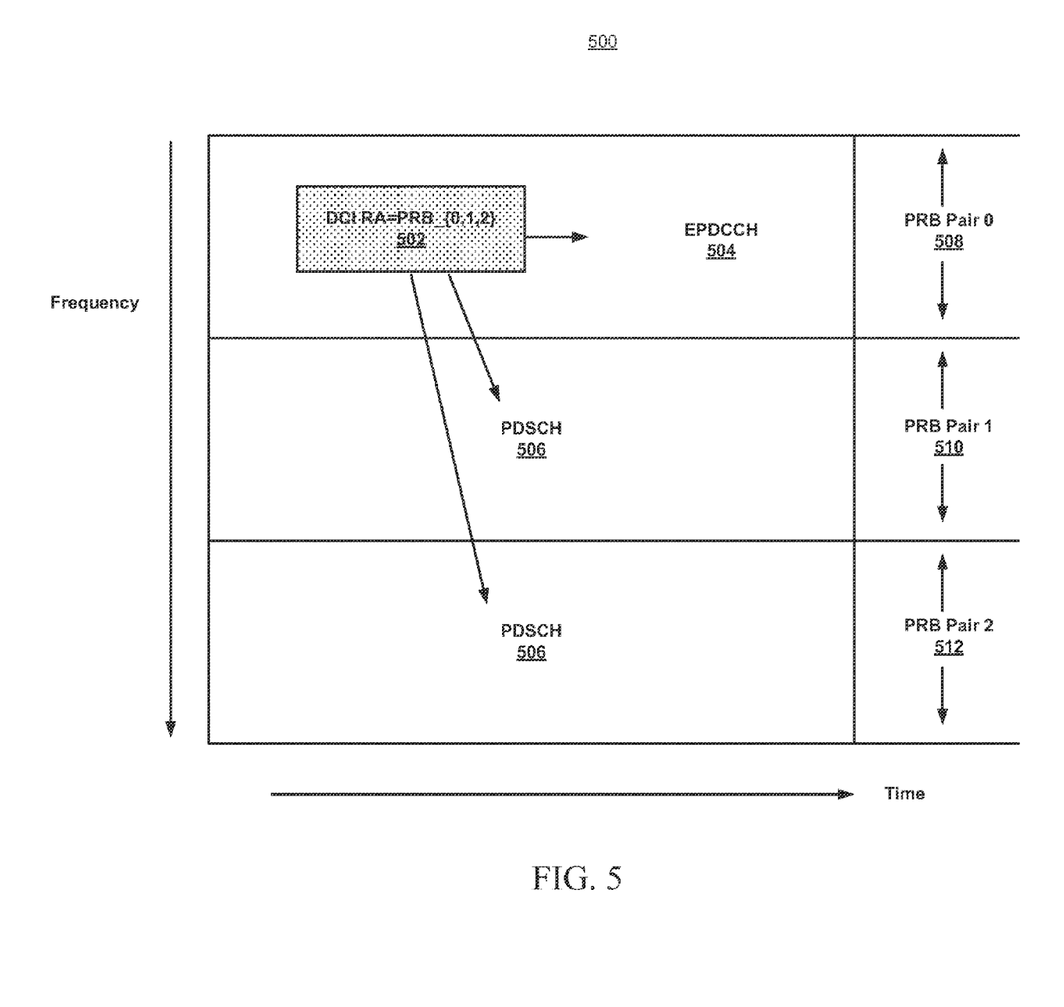
FIG. 5 illustrates an example of enhanced-PDCCH (EPDCCH) and PDSCH signals multiplexed in the frequency domain.

FIG. 5 illustrates an example 500 of EPDCCH and associated PDSCH signals multiplexed in the frequency domain. In a legacy (e.g., non-NCT) system, the EPDCCH 504 may be included in a PRB pair 508, occupying a block of frequency, as specified by a downlink control information (DCI) resource allocation (RA). The EPDCCH 504 is frequency domain multiplexed with PDSCH data 506 occupying other PRB pairs 510, 512. Up to two EPDCCH sets may be configured to a given UE. If the UE is configured for EPDCCH monitoring, the UE may attempt to decode a control channel in both UE-Specific Search Space (USS) of the EPDCHH and in Common Search Space (CSS) of the PDCCH.

Figure 6:
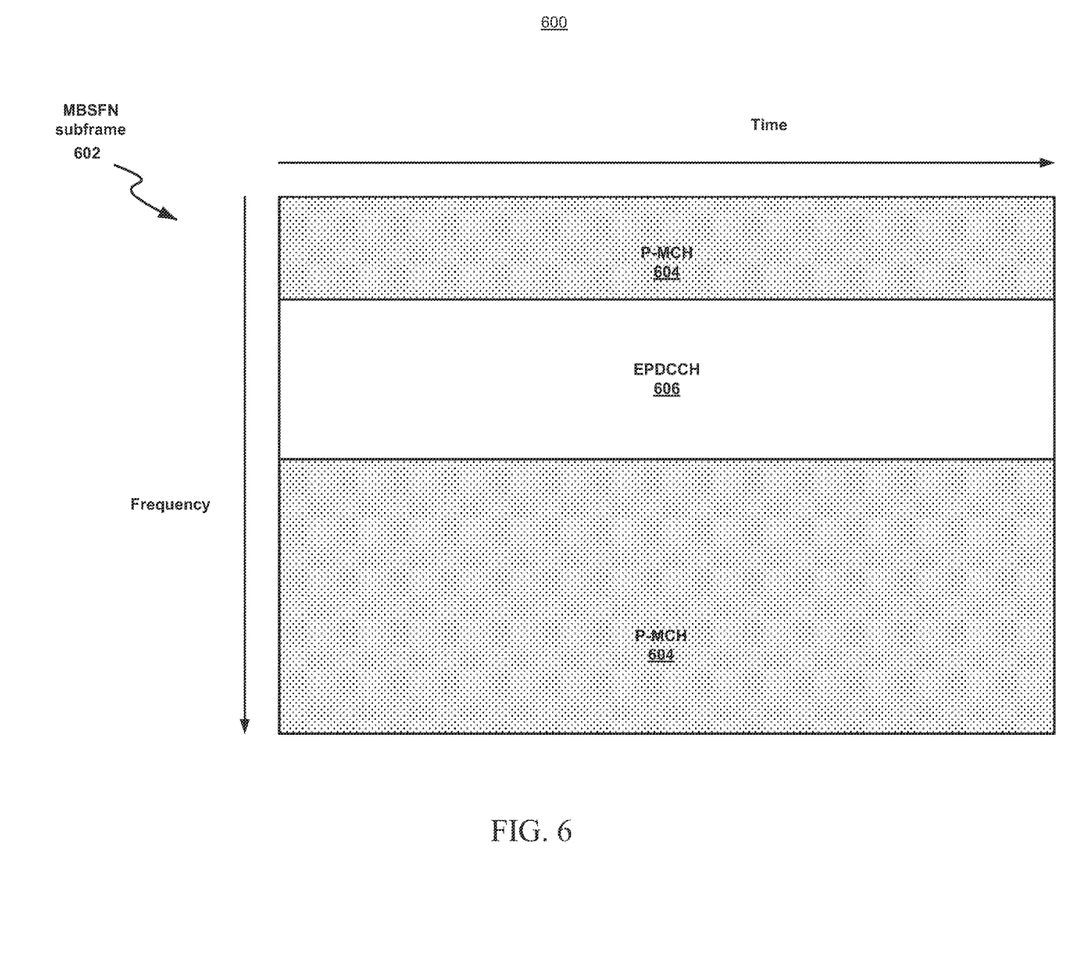
FIG. 6 illustrates a frequency/time mapping of an EPDCCH consistent with one example embodiment of the present disclosure.

FIG. 6 illustrates a frequency/time mapping 600 of an EPDCCH consistent with one example embodiment of the present disclosure, as may be performed, for example, by modules 204 and 304 of the eNB and UE respectively. In this embodiment, the EPDCCH 606 may be included in an MBSFN subframe configured for P-MCH transmission 602 using FDM multiplexing. The location of the EPDDCH 606 within the subframe 602, shared with the P-MCH signal 604, may be pre-determined or may be configured by a RRC message. The RRC message may specify, for example through an extension of the RRC message format, the PRB pairs for the EPDCCH. Alternatively, in some embodiments, for example where the Common Search Space (CSS) is defined for EPDCCH transmission in NCT (located at fixed positions within the downlink control region), the UE can monitor the EPDCCH on CSS in the MBSFN subframe 602.

Since a P-MCH may be transmitted to multiple UEs, the region to be utilized for the EPDCCH 606 within the subframe 602 may be cell-specific, virtual cell-specific or UE group-specific. If signaling overhead is not a consideration, however, the EPDCCH region 606 may be configured in a UE-specific manner. Although, in practice, the usage may typically be cell-specific, the signaling is UE-specific (i.e., provided for each UE). This is similar, for example, to the manner in which CSI-RS configuration is provided by UE specific RRC signaling rather than cell specific signaling even though that operation is cell-specific.

The P-MCH signal, which generally occupies the entire system bandwidth, may be modified to accommodate the EPDCCH. The P-MCH may be mapped to constituent Resource Elements (REs) through "puncturing" of the EPDCCH region or "rate-matching" around the EPDCCH region.

The term puncturing, as used herein, may be described as follows. If "signal B punctures signal A," then the REs of signal A that overlap with the REs of signal B are not mapped or transmitted, but the mapping index is still counted. For example, if the mapping elements of signal A are symbols a(0), . . . , a(99) and those of signal B are b(10), . . . , b(19), then symbols a(10) through a(19) are not mapped or transmitted. Rather, the transmitted signal is a(0), . . . , a(9), b(10), . . . , b(19), . . . , a(20), . . . , a(99)

over a mapping index range of 0 to 99. Therefore, in the case of EPDCCH puncturing, the EPDCCH region of the subframe is defined and then the P-MCH mapping is performed such that P-MCH symbols are not mapped to REs that overlap with the EPDCCH region, but are mapped to REs that do not overlap with the EPDCCH region.

The term rate-matching, as used herein, may be described as follows. If "signal A rate-matches signal B," then the REs of signal A that overlap with the REs of signal B are not mapped or transmitted at their mapping index, but the mapping index is not counted across the associated REs. For example, if the mapping elements of signal A are symbols a(0), . . . , a(89) and those of signal B are b(10), . . . , b(19), then symbols a(0) through a(9) are mapped to index range 0 to 9, symbols b(10) through b(19) are mapped to index range 10 to 19 and symbols a(20) through a(89) are mapped to index range 20 to 99. In other words, the transmitted signal is a(0), . . . , a(9), b(10), . . . , b(19), . . . , a(10), . . . , a(89) over a mapping index range of 0 to 99. Therefore, in the cased of EPDCCH rate-matching, the EPDCCH region of the subframe is defined and then the P-MCH symbols are mapped in sequence to the REs that are not in the EPDCCH region.

Figure 7:
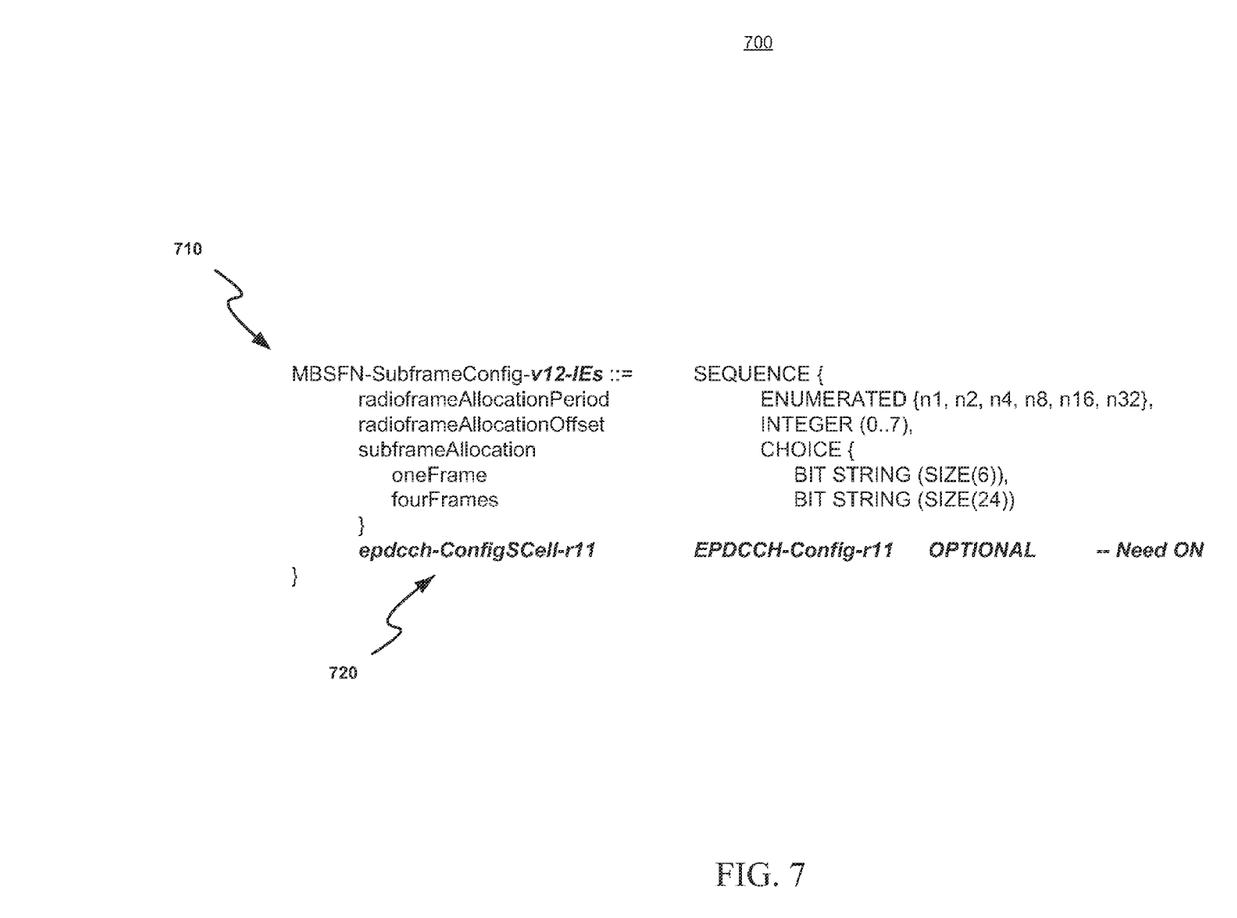
FIG. 7 illustrates a data structure associated with one example embodiment consistent with the present disclosure.

FIG. 7 illustrates a data structure 700 associated with one example embodiment consistent with the present disclosure. An RRC signal that includes the information element (IE) MBSFN-SubframeConfig 710 may be configured to provide the EPDCCH resource information 720. The resource information 720 may include the number of PRB pairs for the EPDCCH set as well information related to their indices. The resource information 720 may further include information identifying the subframes configured for monitoring EPDCCH if only a subset of the subframes is configured for EPDCCH. The RRC signal may be employed by the UE to assist with extract/decoding of the EPDCCH from the MBSFN subframe for P-MCH transmission.

Figure 8:
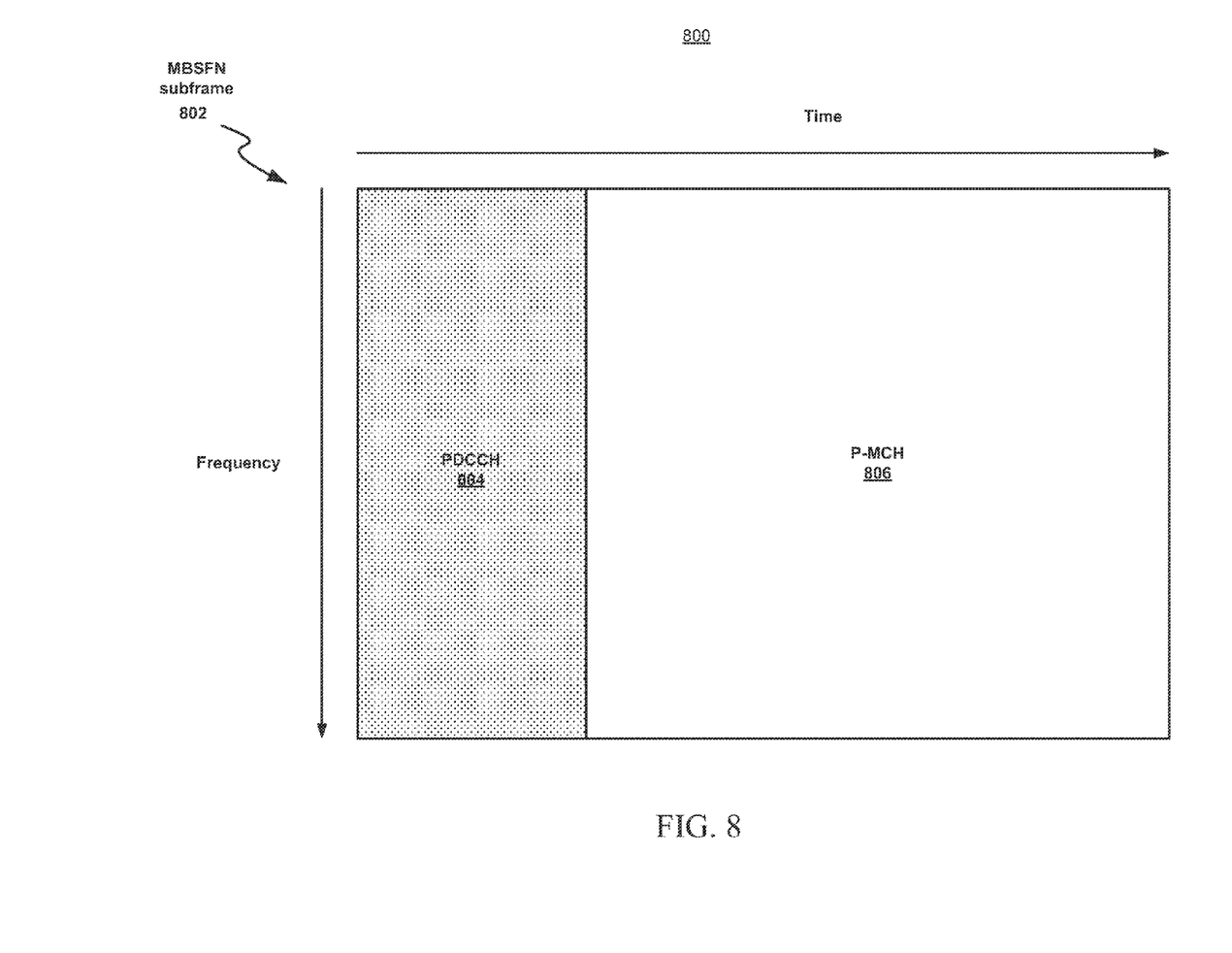
FIG. 8 illustrates a frequency/time mapping of a PDCCH consistent with one example embodiment of the present disclosure.

FIG. 8 illustrates a frequency/time mapping 800 of a PDCCH consistent with one example embodiment of the present disclosure, as may be performed, for example, by modules 202 and 302 of the eNB and UE respectively. In this embodiment, the PDCCH 804 may be included in an MBSFN subframe configured for P-MCH transmission 802. The PDCCH 804 and the P-MCH 806 may be time division multiplexed as shown. In some embodiments, the cell specific reference signal (CRS) may also be transmitted in the PDCCH region 804 and used to assist with demodulation of the PDCCH. This may enable a UE, configured to use EPDCCH for UE-Specific Search Space (USS), to monitor USS using PDCCH in an MBSFN subframe configured for P-MCH. Alternatively, in some embodiments, the PDCCH may be decoded in a non-coherent manner without the use of a reference signal.

The time multiplexed location of the PDCCH within the MBSFN subframe may be determined from an information element within a system information block (SIB) of an RRC signal that provides the length of the non-MBSFN region. The PDCCH is transmitted within the non-MBSFN region of the MBSFN subframe while the P-MCH is transmitted within the MBSFN region of that subframe. The RRC signal may be employed by the UE to assist with extract/decoding of the PDCCH from the MBSFN subframe for P-MCH transmission.

For other types of subframes, for example non MBSFN subframes or MBSFN subframes not configured for P-MCH, the EPDCCH may still be transmitted and employed as described previously.

Figure 9:
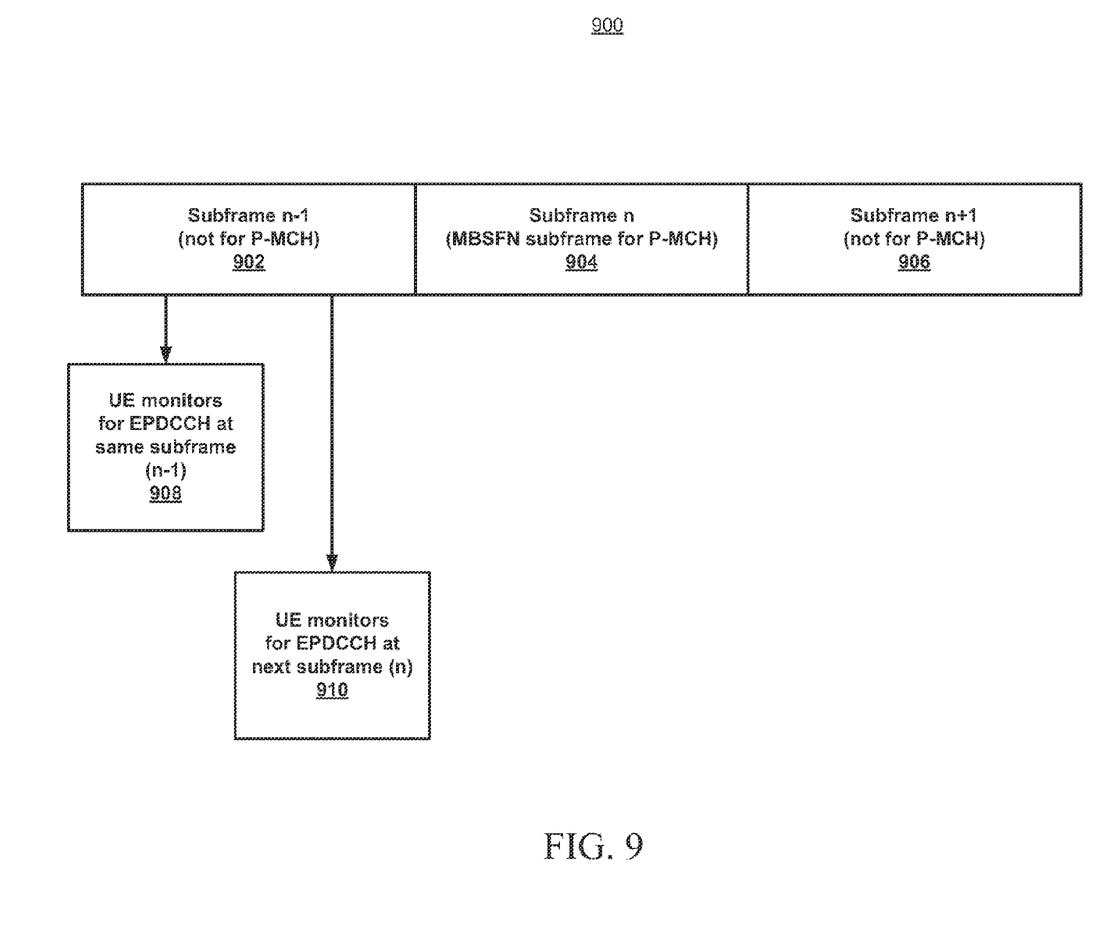
FIG. 9 illustrates a framing structure consistent with one example embodiment of the present disclosure.

FIG. 9 illustrates a framing structure 900 consistent with one example embodiment of the present disclosure. In some embodiments, the Downlink Control Information (DCI) for the MBSFN subframe configured for P-MCH may be transmitted on the PDCCH or EPDCCH located at another subframe or on another carrier which can transmit a PDCCH or EPDCCH signal.

For example, if subframe n 904 is the MBSFN subframe for P-MCH, the eNB may transmit (and the UE may monitor) subframe n+a where a is an integer value (e.g. a=−1 or a=+1). Given that the PDCCH or EPDCCH decoding latency is less than or equal to 4 subframes, the value of a can be negative which may provide sufficient decoding latency margin for more than 4 subframes. The DCI content may further include a data field that represents the scheduled DL subframe intended for a UE. For example, the data field may be set to a bit '0' in the detected DCI of subframe n−1 902 to indicate that the intended subframe is the same subframe as the detected subframe n−1, and the UE should monitor 908 for EPDCCH at the same subframe n−1. Alternatively, the data field may be set to a bit '1' in the detected DCI of subframe n−1 902 to indicate that the intended subframe is for the next subframe (i.e. subframe n 904) relative to the detected subframe n−1 902, and the UE should monitor 910 for EPDCCH at the next subframe n.

Although there is no inherent limitation in these embodiments as to the application of the DCI, for example as a downlink (DL) assignment or an uplink (UL) grant, given that the MBSFN subframe configured for P-MCH is not generally expected to transmit a PDSCH, the DCI may be particularly useful for UL grant and/or PDCCH for Semi-Persistent Scheduling (SPS) release. In the case of SPS-release, the timing for activation/release may be associated with the timing of the MBSFN subframe.

In some embodiments, the PDCCH or EPDCCH may be multiplexed (e.g., transmitted simultaneously) with the P-MCH though superposition of the signals, as may be performed, for example, by modules 206 and 306 of the eNB and UE respectively. A signal transmission from an eNB at cell A, at a resource index k, may be expressed in the frequency domain by equation (1):

$$S^A(k) = M^A(k) + E^A(k) \quad (1)$$

where $S^A(k)$ represents the transmitted signal, $M^A(k)$ represents the P-MCH and $E^A(k)$ represents the EPDCCH (or PDCCH).

The received signal at a UE, from cells 0 to B−1 may be expressed as equation (2):

$$R(k) = \sum_{m=0}^{B-1} M^m(k) \cdot H^m(k) + \sum_{m=0}^{B-1} E^m(k) \cdot H^m(k) + N(k) \quad (2)$$

where R(k), $H^m(k)$, and N(k) represent the received signal, channel transfer function, and additive white Gaussian noise (AWGN) respectively. By employing suitable power control on the P-MCH and EPDCCH, $M^m(k)$ can be expressed as $M^m(k) = P^m(k) \cdot M_{PMCH}^m$, where $M_{PMCH}^m$ is the P-MCH signal and $P^m(k)$ is the transmitted power. Since the P-MCH signal is the same for all cells within an MBSFN area, the condition of $M^m(k) = M(k)$ can hold for all m (i.e. MBSFN transmissions). Therefore, equation (2) may be re-written as equation (3):

$$R(k) = B \cdot M(k) \cdot \sum_{m=0}^{B-1} H^m(k) + \sum_{m=0}^{B-1} E^m(k) \cdot H^m(k) + N(k) \quad (3)$$

When a sufficient power is allocated for P-MCH transmission, a UE may first decode M(k) (i.e., P-MCH) successfully under conditions of high signal to interference plus noise ratio (SINR). The UE may then subtract (or cancel out) the decoded P-MCH from the received signal resulting in equation (4):

$$R(k) = \sum_{m=0}^{B-1} E^m(k) \cdot H^m(k) + N(k) \quad (4)$$

thus allowing for the EPDCCH (or PDCCH) to also be successfully decoded with high SINR. In some embodiments, a cyclic redundancy check (CRC) bit or bits maybe included in the P-MCH transport block to increase the reliability of the cancellation of the P-MCH from the received signal.

Alternatively, in some embodiments, the UE may be configured to forgo the opportunity to monitor the PDCCH or EPDCCH in the MBSFN subframe for P-MCH transmission in an NCT wireless network. This may provide an implementation of reduced complexity in exchange for the potential loss of an opportunity to receive a UL grant and SPS release.

Figure 10:
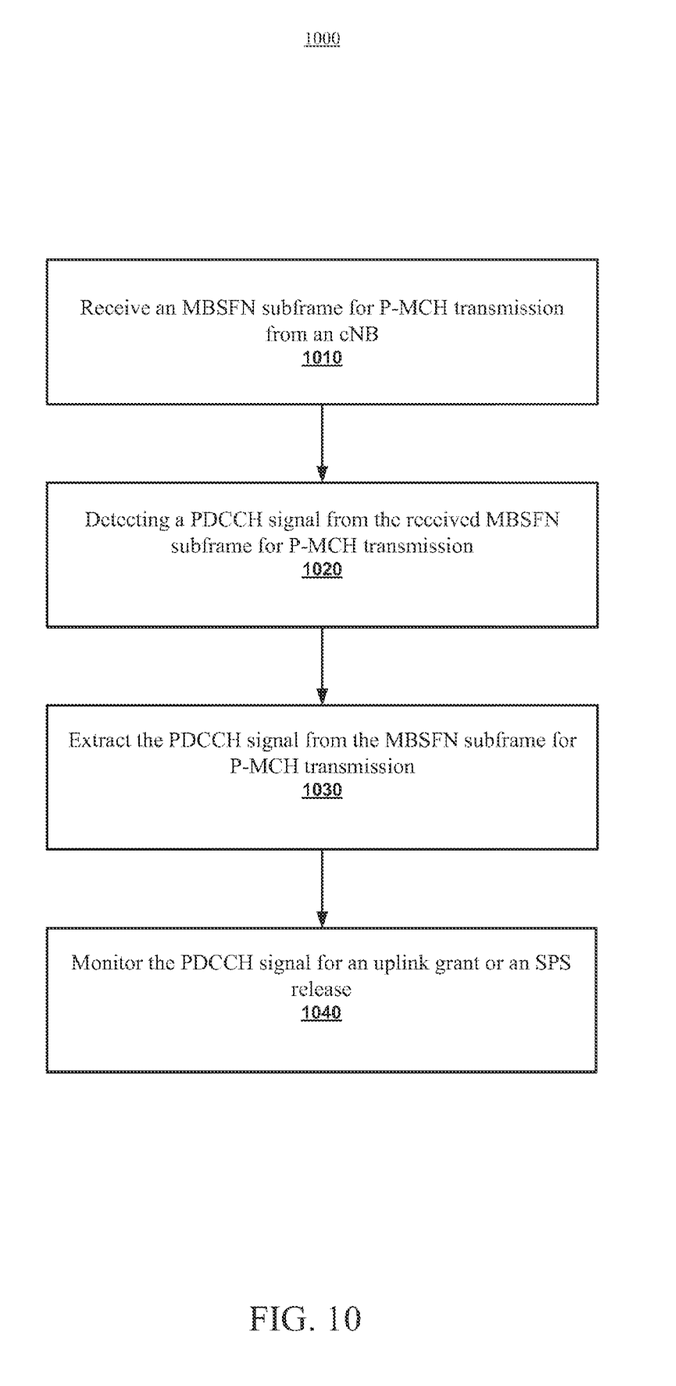
FIG. 10 illustrates a flowchart of operations of an example embodiment consistent with the present disclosure.

FIG. 10 illustrates a flowchart of operations 1000 of an example embodiment consistent with the present disclosure. At operation 1010, an MBSFN subframe for P-MCH transmission is received from an eNB. At operation 1020, a PDCCH signal is detected in the received MBSFN subframe for P-MCH transmission is detected. In some embodiments, the PDCCH signal may be an EPDCCH signal. At operation 1030, the PDCCH signal is extracted from the MBSFN subframe for P-MCH transmission. At operation 1040, the PDCCH signal is monitored for an uplink grant or an SPS release.

Figure 11:
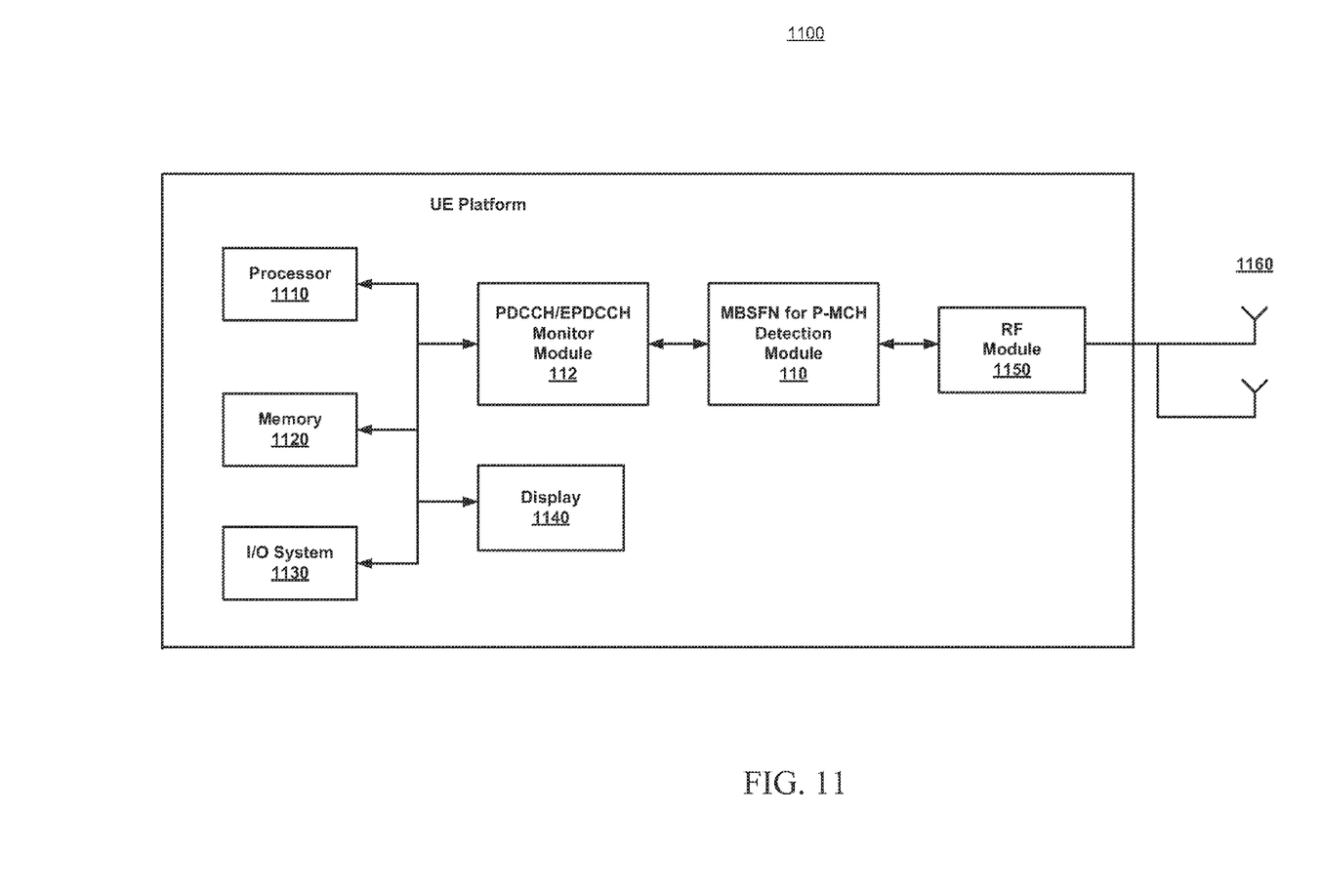
FIG. 11 illustrates a platform of one example embodiment consistent with the present disclosure.

FIG. 11 illustrates a platform 1100 of one example embodiment consistent with the present disclosure. The platform 1100 may be a mobile communication device, such as, for example, a UE device (smartphone), a tablet, a laptop computing device or any other device configured to transmit or receive wireless signals over a wireless network. The wireless network may comply with, or otherwise be compatible with, the Third Generation Partnership Project (3GPP) Long Term Evolution (LTE) and/or LTE-Advanced (LTE-A) based wireless network standard, including current, previous and future versions of that standard. In some embodiments, platform 1100 may include a processor 1110, memory 1120, an input/output (I/O) system 1130, a display/keyboard or other type of user interface (UI) 1140 such as, for example, a touchscreen. Platform 1100 may further include an RF processing module 1150 as well as one or more antennas 1160 which may form part of a Multiple Input Multiple Output (MIMO) antenna system. Platform 1100 may further include the MBSFN for P-MCH detection module 110 configured to detect the PDCCH or EPDCCH in the received signal provided by the RF module 1150. Platform 1100 may further include the PDCCH/EPDCCH monitor module 112 configured to extract and decode the PDCCH/EPDCCH signal from the MBSFN for P-MCH subframe. Any number of platforms 1100 may transmit or receive signals through RF module 1150 and antennas 1160 over the wireless network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides an apparatus, methods, systems and computer-readable storage medium for improved control channel monitoring in a New Carrier Type (NCT) wireless network. The following examples pertain to further embodiments.

According to one aspect there is provided an evolved Node B (eNB) transceiver. The eNB may include a physical downlink control channel (PDCCH) generation module to generate a PDCCH signal. The eNB of this example may also include a Multicast/Broadcast over Single Frequency Network (MBSFN) for Physical Multicast Channel (P-MCH) encoding module to encode the PDCCH signal in an MBSFN subframe for P-MCH transmission. The eNB of this example may further include a transmitter circuit to transmit the MBSFN subframe for P-MCH transmission to a User Equipment (UE).

Another example eNB includes the forgoing components and the MBSFN for P-MCH encoding module further includes a time domain multiplexing (TDM) module to time multiplex the PDCCH signal with a P-MCH signal in the MBSFN subframe for P-MCH.

Another example eNB includes the forgoing components and the PDCCH generation module is further to generate an enhanced PDCCH (EPDCCH) signal.

Another example eNB includes the forgoing components and the MBSFN for P-MCH encoding module further includes a frequency domain multiplexing (FDM) module to frequency multiplex the EPDCCH signal with a P-MCH signal in the MBSFN subframe for P-MCH.

Another example eNB includes the forgoing components and the MBSFN for P-MCH encoding module further includes a superposition module to superimpose the PDCCH signal onto a P-MCH signal in the MBSFN subframe for P-MCH.

Another example eNB includes the forgoing components and the frequency domain multiplexing further includes mapping the P-MCH signal to resource elements by puncturing regions of the EPDCCH signal in the MBSFN subframe for P-MCH.

Another example eNB includes the forgoing components and the frequency domain multiplexing further includes mapping the P-MCH signal to resource elements by rate matching regions of the EPDCCH signal in the MBSFN subframe for P-MCH.

Another example eNB includes the forgoing components and downlink control information (DCI) for the MBSFN subframe for P-MCH is transmitted at an alternate subframe and/or transmitted on a different carrier.

Another example eNB includes the forgoing components and the transmitter circuit is further to transmit a radio resource control (RRC) message providing information to the UE to enable decoding by the UE of the PDCCH or EPDCCH signal in the MBSFN subframe for P-MCH transmission.

According to another aspect there is provided a UE. The UE may include a receiver circuit to receive an MBSFN subframe for P-MCH transmission from an eNB. The UE of this example may also include an MBSFN for P-MCH detection module to detect and extract an EPDCCH signal from the MBSFN subframe for P-MCH transmission. The UE of this example may further include an EPDCCH monitor module to decode and monitor the extracted EPDCCH signal.

Another example UE includes the forgoing components and the MBSFN for P-MCH detection module further includes a frequency domain de-multiplexing module to frequency de-multiplex the EPDCCH signal from a P-MCH signal in the MBSFN subframe for P-MCH.

Another example UE includes the forgoing components and the MBSFN for P-MCH detection module further includes a superposition recovery module to recover the EPDCCH signal from a superposition of the EPDCCH signal onto a P-MCH signal in the MBSFN subframe for P-MCH.

Another example UE includes the forgoing components and the EPDCCH monitor module is further to monitor the EPDCCH signal for an uplink grant or a Semi-Persistent Scheduling (SPS) release.

Another example UE includes the forgoing components and downlink control information (DCI) for the MBSFN subframe for P-MCH is received at an alternate subframe and/or transmitted on a different carrier.

Another example UE includes the forgoing components and the receiver circuit is further to receive a radio resource control (RRC) message providing information from the eNB to enable decoding of the EPDCCH signal in the MBSFN subframe for P-MCH transmission.

According to another aspect there is provided a UE. The UE may include a receiver circuit to receive an MBSFN subframe for P-MCH transmission from an eNB. The UE of this example may also include an MBSFN for P-MCH detection module to detect and extract a PDCCH signal from the MBSFN subframe for P-MCH transmission. The UE of this example may further include a PDCCH monitor module to decode and monitor the extracted PDCCH signal.

Another example UE includes the forgoing components and the MBSFN for P-MCH detection module further includes a time domain de-multiplexing module to time de-multiplex the PDCCH signal from a P-MCH signal in the MBSFN subframe for P-MCH.

Another example UE includes the forgoing components and the MBSFN for P-MCH detection module further includes a superposition recovery module to recover the PDCCH signal from a superposition of the PDCCH signal onto a P-MCH signal in the MBSFN subframe for P-MCH.

Another example UE includes the forgoing components and the PDCCH monitor module is further to monitor the PDCCH signal for an uplink grant or a Semi-Persistent Scheduling (SPS) release.

Another example UE includes the forgoing components and downlink control information (DCI) for the MBSFN subframe for P-MCH is received at an alternate subframe and/or transmitted on a different carrier.

Another example UE includes the forgoing components and the receiver circuit is further to receive a radio resource control (RRC) message providing information from the eNB to enable decoding of the PDCCH signal in the MBSFN subframe for P-MCH transmission.

According to another aspect there is provided a method. The method may include receiving an MBSFN subframe for P-MCH transmission from an eNB. The method of this example may also include detecting a PDCCH signal from the received MBSFN subframe for P-MCH transmission. The method of this example may further include extracting the PDCCH signal from the MBSFN subframe for P-MCH transmission. The method of this example may further include monitoring the PDCCH signal for an uplink grant or an SPS release.

Another example method includes the forgoing operations and further includes detecting an EPDCCH signal from the received MBSFN subframe for P-MCH transmission and extracting the EPDCCH signal from the MBSFN subframe for P-MCH transmission.

Another example method includes the forgoing operations and further includes time de-multiplexing the PDCCH signal from a P-MCH signal in the MBSFN subframe for P-MCH.

Another example method includes the forgoing operations and further includes frequency de-multiplexing the EPDCCH signal from a P-MCH signal in the MBSFN subframe for P-MCH.

Another example method includes the forgoing operations and further includes recovering the PDCCH or EPDCCH signal from a superposition of the PDCCH or EPDCCH signal onto a P-MCH signal in the MBSFN subframe for P-MCH.

Another example method includes the forgoing operations and further includes receiving an RRC message providing information from the eNB to enable decoding of the PDCCH or EPDCCH signal in the MBSFN subframe for P-MCH transmission.

According to another aspect there is provided a system. The system may include a means for receiving an MBSFN subframe for P-MCH transmission from an eNB. The system of this example may also include a means for detecting a PDCCH signal from the received MBSFN subframe for P-MCH transmission. The system of this example may further include a means for extracting the PDCCH signal from the MBSFN subframe for P-MCH transmission. The system of this example may further include a means for monitoring the PDCCH signal for an uplink grant or an SPS release.

Another example system includes the forgoing components and further includes a means for detecting an EPDCCH signal from the received MBSFN subframe for P-MCH transmission and means for extracting the EPDCCH signal from the MBSFN subframe for P-MCH transmission.

Another example system includes the forgoing components and further includes a means for time de-multiplexing the PDCCH signal from a P-MCH signal in the MBSFN subframe for P-MCH.

Another example system includes the forgoing components and further includes a means for frequency de-multiplexing the EPDCCH signal from a P-MCH signal in the MBSFN subframe for P-MCH.

Another example system includes the forgoing components and further includes a means for recovering the PDCCH or EPDCCH signal from a superposition of the PDCCH or EPDCCH signal onto a P-MCH signal in the MBSFN subframe for P-MCH.

Another example system includes the forgoing components and further includes a means for receiving an RRC message providing information from the eNB to enable decoding of the PDCCH or EPDCCH signal in the MBSFN subframe for P-MCH transmission.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An evolved Node B (eNB) transceiver comprising:
physical downlink control channel (PDCCH) generation circuitry to generate a PDCCH signal;
Multicast/Broadcast over Single Frequency Network (MBSFN) for Physical Multicast Channel (P-MCH) encoding circuitry comprising time division multiplexing circuitry and frequency division multiplexing circuitry; and
a transmitter circuit to transmit a MBSFN subframe for P-MCH transmission to a User Equipment (UE);
wherein said time division multiplex circuitry time multiplexes said PDCCH signal with a P-MCH signal;
wherein said frequency division multiplexing circuitry frequency multiplexes an Enhanced Physical Downlink Control Channel ("-EPDCCH-") signal with said P-MCH signal in a region of said MBFSN subframe that corresponds specifically to said UE receiving said transmission; and
wherein at least one cyclic redundancy check (CRC) bit is included in a P-MCH transport block of said MBSFN subframe.

2. The eNB of claim 1, wherein said PDCCH generation circuitry is further to generate an enhanced PDCCH (EPDCCH) signal.

3. The eNB of claim 2, wherein said MBSFN for P-MCH encoding circuitry further comprises frequency domain multiplexing (FDM) circuitry to frequency multiplex said EPDCCH signal with a P-MCH signal in said MBSFN subframe for P-MCH.

4. The eNB of claim 1, wherein said MBSFN for P-MCH encoding circuitry further comprises superposition circuitry to superimpose said PDCCH signal onto a P-MCH signal in said MBSFN subframe for P-MCH.

5. The eNB of claim 3, wherein said frequency domain multiplexing further comprises mapping said P-MCH signal to resource elements by puncturing regions of said EPDCCH signal in said MBSFN subframe for P-MCH.

6. The eNB of claim 3, wherein said frequency domain multiplexing further comprises mapping said P-MCH signal to resource elements by rate matching regions of said EPDCCH signal in said MBSFN subframe for P-MCH.

7. The eNB of claim 1, wherein downlink control information (DCI) for said MBSFN subframe for P-MCH is transmitted at an alternate subframe and/or transmitted on a different carrier.

8. The eNB of claim 2, wherein said transmitter circuit is further to transmit a radio resource control (RRC) message providing information to said UE to enable decoding by said UE of said PDCCH or EPDCCH signal in said MBSFN subframe for P-MCH transmission.

9. User Equipment (UE) comprising:
a receiver circuit to receive a Multicast/Broadcast over Single Frequency Network (MBSFN) subframe for Physical Multicast Channel (P-MCH) transmission from an evolved Node B (eNB), the MBSFN subframe including a P-MCH transport block having at least one cyclic redundancy check (CRC) bit;
MBSFN for P-MCH detection circuitry to detect and extract a physical downlink control channel (PDCCH) signal and an enhanced PDCCH (EPDCCH) signal from said MBSFN subframe for P-MCH transmission;
wherein:
said detection circuitry comprises time domain demux circuitry to perform time domain de-multiplexing of said PDCCH signal; and
said detection circuitry comprises frequency demux circuitry to perform frequency domain de-multiplexing of said EPDCCH signal from a region of said MBFSN subframe that corresponds specifically to said UE; and
EPDCCH monitor circuitry to decode and monitor said extracted EPDCCH signal.

10. The UE of claim 9, wherein said MBSFN for P-MCH detection circuitry further comprises superposition recovery circuitry to recover said EPDCCH signal from a superposition of said EPDCCH signal onto a P-MCH signal in said MBSFN subframe for P-MCH.

11. The UE of claim 9, wherein said EPDCCH monitor circuitry is further to monitor said EPDCCH signal for an uplink grant or a Semi-Persistent Scheduling (SPS) release.

12. The UE of claim 9, wherein downlink control information (DCI) for said MBSFN subframe for P-MCH is received at an alternate subframe and/or transmitted on a different carrier.

13. The UE of claim 9, wherein said receiver circuit is further to receive a radio resource control (RRC) message providing information from said eNB to enable decoding of said EPDCCH signal in said MBSFN subframe for P-MCH transmission.

14. User Equipment (UE) comprising:
a receiver circuit to receive a Multicast/Broadcast over Single Frequency Network (MBSFN) subframe for Physical Multicast Channel (P-MCH) transmission from an evolved Node B (eNB), said MBSFN subframe including a P-MCH transport block having at least one cyclic redundancy check (CRC) bit;
MBSFN for P-MCH detection circuitry to detect and extract a physical downlink control channel (PDCCH) signal, or an enhanced PDCCH (EPDCCH) signal, from a region of said MBSFN subframe for P-MCH transmission that corresponds specifically to said UE;
wherein:
said detection circuitry comprises time domain demux circuitry to perform time domain de-multiplexing of said PDCCH signal; and
said detection circuitry comprises frequency demux circuitry to perform frequency domain de-multiplexing of said EPDCCH signal;
PDCCH monitor circuitry to decode and monitor said extracted PDCCH signal.

15. The UE of claim 14, wherein said MBSFN for P-MCH detection circuitry further comprises superposition recovery circuitry to recover said PDCCH signal from a superposition of said PDCCH signal onto a P-MCH signal in said MBSFN subframe for P-MCH.

16. The UE of claim 14, wherein said PDCCH monitor circuitry is further to monitor said PDCCH signal for an uplink grant or a Semi-Persistent Scheduling (SPS) release.

17. The UE of claim 14, wherein downlink control information (DCI) for said MBSFN subframe for P-MCH is received at an alternate subframe and/or transmitted on a different carrier.

18. The UE of claim 14, wherein said receiver circuit is further to receive a radio resource control (RRC) message providing information from said eNB to enable decoding of said PDCCH signal in said MBSFN subframe for P-MCH transmission.

19. A method comprising:
providing User Equipment comprising Multicast/Broadcast over Single Frequency Network (MBSFN) for Physical Multicast Channel (P-MCH) detection circuitry to detect and extract a physical downlink control channel (PDCCH) signal, or an enhanced PDCCH (EPDCCH) signal, from a MBSFN subframe for P-MCH transmission, wherein said MBSFN subframe includes a P-MCH transport block having at least one cyclic redundancy check (CRC) bit, wherein said detection circuitry comprises time domain demux circuitry to perform time domain de-multiplexing of said PDCCH signal from a region of said MBFSN subframe that corresponds specifically to said UE, and wherein said detection circuitry comprises frequency demux circuitry to perform frequency domain de-multiplexing of said EPDCCH signal;
receiving by said User Equipment an MBSFN subframe for P-MCH transmission from an eNB;
detecting a PDCCH signal, or an EPDCCH signal, from said received MBSFN subframe for P-MCH transmission;
extracting said PDCCH signal, or said EPDCCH signal, from said MBSFN subframe for P-MCH transmission; and
monitoring said PDCCH signal, or said EPDCCH signal, for an uplink grant or an SPS release.

20. The method of claim 19, further comprising detecting an EPDCCH signal from said received MBSFN subframe for P-MCH transmission and extracting said EPDCCH signal from said MBSFN subframe for P-MCH transmission.

21. The method of claim 19, further comprising time de-multiplexing said PDCCH signal from a P-MCH signal in said MBSFN subframe for P-MCH.

22. The method of claim 20, further comprising frequency de-multiplexing said EPDCCH signal from a P-MCH signal in said MBSFN subframe for P-MCH.

* * * * *